United States Patent Office 3,383,178
Patented May 14, 1968

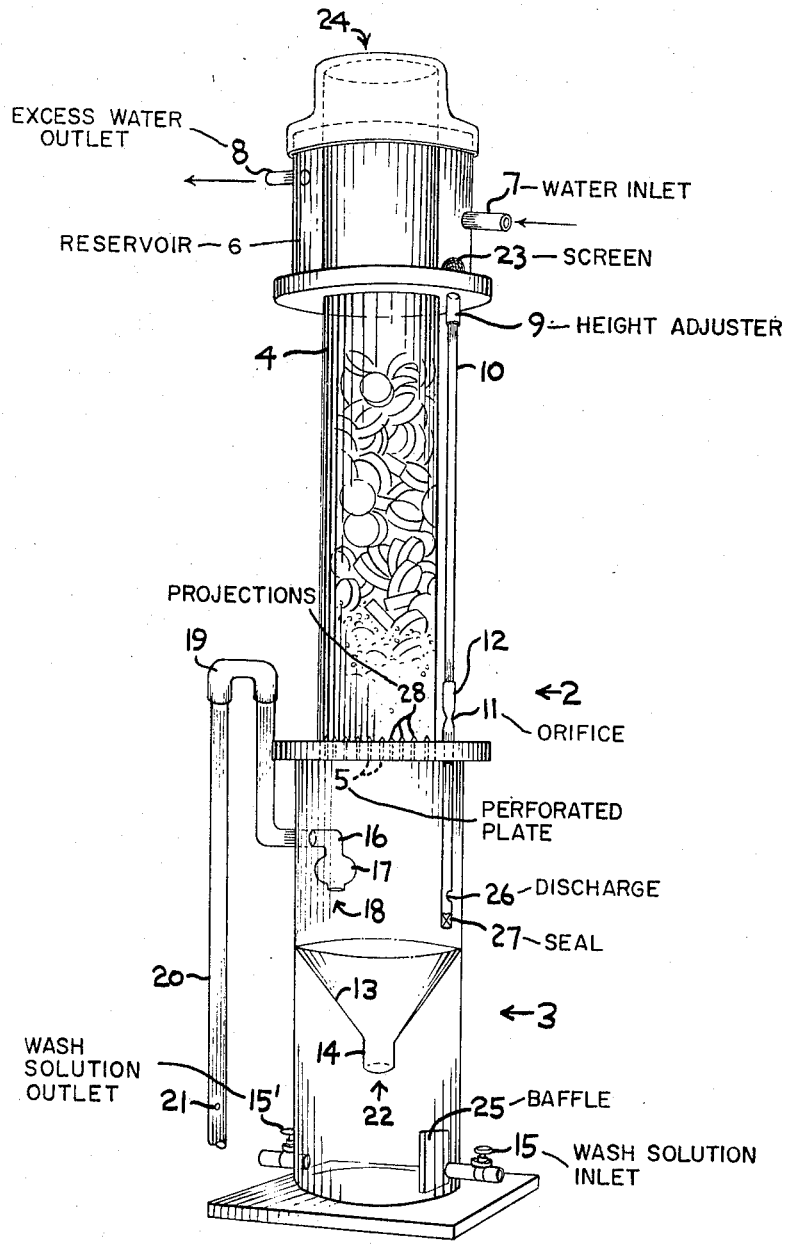

3,383,178
CHEMICAL DISSOLVER
Albert Dietz, Wadsworth, Ohio, assignor to Pittsburgh Plate Glass Company, Pittsburgh, Pa., a corporation of Pennsylvania
Filed Dec. 2, 1964, Ser. No. 415,428
6 Claims. (Cl. 23—272)

ABSTRACT OF THE DISCLOSURE

Solids such as calcium hypochlorite are dissolved using a device comprising an upper chamber for holding the water soluble solid and a lower chamber. Liquid is fed to the lower chamber up into the upper chamber. A siphon responsive to the liquid level drains the liquid from the upper chamber and removes the solution from the lower chamber. Insolubles are separated from solution before removal by the siphon action and collected in a lower zone of the lower chamber. A constant liquid level source is utilized. Ideally, the siphon's upleg includes an increased volume section and the downleg includes a means for insuring complete drainage.

---

This invention relates to the formation and introduction of a solution into a reservoir, and especially pertains to forming chlorine containing solutions from solid water soluble sources thereof and the introduction of such solutions into the water of a swimming pool or the like. It also concerns special apparatus for dissolving solids and discharging the resulting solution into liquid bodies.

Calcium hydrochlorite is one highly desirable source of chlorine for treating swimming pool water because of its high percent of available chlorine (up to 99 percent), favorable cost, and convenience of handling. Previously, the solid calcium hypochlorite was broadcast by hand at predetermined intervals to effect the treatment. This method suffered the disadvantages of uneven distribution, dustiness causing physical discomfort, and fairly rapid loss of chlorine due to decomposition of calcium hypochlorite in sunlight. This method also leaves a residue which clouds the water and settles as an objectionable precipitate at the bottom of the pool. To overcome these difficulties feeders have been proposed which filter these unwanted precipitates but the usefulness of these devices has been seriously restricted because insolubles accumulate and clog feed lines, filters, etc.

According to this invention, apparatus is provided for dissolving solids such as calcium hypochlorite which segregates insolubles and prevents their accumulating in the feeder and clogging feed lines. There is thus provided a chlorine containing solution which is substantially free of undesirable insoluble material siphoned at regular and uniform intervals into the pool.

The apparatus of this invention may be readily and clearly understood by reference to the drawing which is a perspective view of the apparatus. In the drawing, numeral 2 refers to the device in general. Feeding device 2 is preferably made of molded plastics which are especially suitable in the service to which the apparatus is to be placed. For example, in handling calcium hypochlorite as hereinafter detailed more completely, an ideal plastic is cellulose butyrate polyester. Other plastics such as polycarbonate and other cellulose polyesters are also suitable. Obviously, the materials of construction are chosen recognizing the corrosive problems of the material and solution. A pair of cylindrical elements are separated by a perforated plate 5 to provide for lower chamber 3 and upper chamber 4. Plate 5 is the support for the solids such as calcium hypochlorite tablets which are charged to and contained in chamber 4. Plate 5 contains numerous, small projections 28 to provide an uneven surface for the tablets to rest on.

Encircling chamber 4 is reservoir 6 which provides for a constant level liquid source for the feeder. Inlet 7 feeds reservoir 6 while outlet overflow 8 removes excess water from the said reservoir in maintaining a constant liquid level therein. Extending downward from reservoir 6 is tubular member 9 which is attached by frictional engagement to tube 10 which can be of varied lengths to allow readily for changes made in the height of reservoir 6 (when reservoir 6 is adjustably mounted) above chamber 3. Within reservoir 6 screen 23 fits over tube 9 to prevent the accumulation of dirt and other undesirable material in the tube assembly. Tube 10 is frictionally attached to an extension 12 which is provided with orifice 11 as a means for regulating and providing uniform flow of the liquid from reservoir 6 into chamber 3. The relative position of orifice 11 to outlet 26 is important to reduce the possibility of air locking of solvent during the operation of the device. Orifice 11 is, therefore, preferably placed relatively close to outlet 26 along extension 12 to substantially reduce this possibility. Extension 12 terminates within chamber 3 preferably below the lowest liquid level reached by the solution during the operation of the device, i.e., point 18 at the bottom of tube 16. Extension 12 is preferably sealed with element 27 at its end. Alternatively, tubes 9, 10, and 12 may be fabricated as one complete member extending the preferred length and containing the preferred embodiments. The liquid is discharged into chamber 3 via outlet 26 in the side of extension 12 located at a level below the bottom of tube 16. This outlet situated below the lowest liquid level contained in chamber 3 during the operation of the device substantially reduces swirling of the incoming water. The gravitational energy of the falling solvent is substantially dissipated when it strikes the bottom of tube 12 (element 27) and spills out into chamber 3 with less swirling force. It is convenient to place outlet 26 such that the solvent spills out against the side wall of chamber 3 further reducing swirling of the influent solvent. If desired, a plurality of outlets may be employed as ports for solvent admission to chamber 3. Chamber 4 is superimposed concentrically above chamber 3. Cap 24 loosely covers chamber 4 and reservoir 6 to keep the interiors free of debris.

Within chamber 3 through 13 circumferentially radiates downward within the chamber in a conical fashion until it terminates a predetermined distance above the base of chamber 3) and below plate 5 into an axially arranged and downwardly extending tubular member 14. This funnel structure is of sufficient pitch to allow material to slide freely along its surface and be delivered into the bottom chamber 3. Near the base and in the side of chamber 3 are outlet valves 15 and 15'. Baffle plate 25 is situated just inside of the opening to a valve 15.

Extending into chamber 3 and situated to the side and away from the bottom of receptacle 4 and the perforations in plate 5, is tube 16 having along its length an enlarged bulb 17 providing an enlarged volume within tube 16. Opening 18 at the bottom of bulb 17 has a diameter at least as large, or even larger than the diameter of tube 16 above bulb 17. Frictionally attached to tube 16 outside of chamber 3 is inverted U-tube 19. Tube 19 is frictionally attached to tube 20. This assembly of elements 16, 17, 18, 19 and 20 forms a siphon as will hereinafter be further explained. It is important that the siphon downleg be free of obstruction as will hereinafter be more completely explained. Near the end of tube 20 and in its side is a hole 21.

In the operation of this device, water (or other appropriate solvent) is supplied through inlet 7 to reservoir 6 while continuous overflow is exited through outlet 8 even after the water requirements of the feeder have been fully met. This creates and maintains a constant level head of water from which water is added to chamber 3 through tubes 9, 10 and 12 at a steady rate. The constancy of this rate can be insured by use of orifice 11.

Receptacle 4 is charged with solid calcium hypochlorite (or other solid water soluble material) to any desired height. When the device is initially placed in operation, water enters chamber 3 from the reservoir head 6, gradually filling the lower part of the chamber until the liquid rises to level 22 (at the bottom of tubular member 14) whereupon a water seal is set trapping air in the region above level 22 and below trough 13. This seal remains unbroken during the recommended operation of the feeder. It prevents turbulence in the water below trough 13 such as otherwise is apt to occur because of the swirling of incoming water or the intermittent siphon action above trough 13.

The water level continues to rise up through plate 5 and into receptacle 4 until it reaches the level of the top of U-tube 19. As this occurs, tube 19 is also filled with water. Meanwhile, as the water level has risen above plate 5, calcium hypochlorite is dissolved forming a chlorine containing solution. Insoluble precipitates tend to settle downward through the upper section of chamber 3 into trough 13 whereupon they are funneled into the lower portion of chamber 3 through member 14. Operation and the relative size of the chambers are such that there is sufficient retention time between siphonings to allow for this settling.

Although trough 13 may be placed anywhere within chamber 3, it is often advantageous to place it near plate 5 as long as level 18 on the siphon is above the top of trough 13. The effect of this is to cause more rapid siphon cycles but less volume of solution to be discharged per cycle. A more concentrated solution is thereby discharged at each siphon cycle. The settling of insolubles is thus facilitated. However, trough 13 may be placed below this level or more near the bottom of chamber 3. In this manner, the siphon may be treated at lower levels and hence the cycles are lengthened but the volume of the solution to be discharged per cycle is increased. The net effect of this embodiment is a slightly less efficient settling process. The settlings accumulate on the bottom of chamber 3 isolated from turbulence which may result from the continued operation of the device. When the rising water level reaches the level of the top of U-tube 19, i.e. fills the upward leg of tube 19, a siphon action is actuated emptying the chlorine containing solution through tubes 16, 19 and 20 into a feed line to the body of water, e.g. swimming pool, to be treated therewith. As the solution is removed, the water level continuously falls until it reaches a level parallel with the bottom of tube 16 at the opening 18 and the siphon is broken halting further discharge of liquid from chamber 3 via tube 19. In this sequence of steps, water continuously is fed from reservoir 6 via tubes 9, 10 and 12 through discharge port 26 into chamber 3. However, the rate of feed is less than the rate of discharge via the siphon. Usually, the diameter of the feed line is therefore smaller than that of the siphon to insure this.

Bulb 17 provides for the separation of gas bubbles entrained in the liquid which occurs near the siphon cycle end. Thus, bulb 17 provides the important function of allowing the gas bubbles to travel up the siphon and the solution to travel down just as the siphon action is about to break. Absence of this bulb prevents the siphon action from breaking. After the bulb has allowed the separation of bubbles and solution and the siphon action has been broken, hole 21 in tube 20 allows the pressure to be equalized within the system by insuring that even a small amount of the solution does not remain in the tube which would cause a premature siphon cycle to occur. Hole 21 causes the complete drainage of the siphon tube in preparation for the next cycle.

Thus, in the operation of this device a solvent such as water dissolves a salt such as calcium hypochlorite or other soluble material and the resulting solution formed is delivered in sequential manner by siphon action.

In its preferred form, the U-tube is adjustably mounted so that its upper level may be raised or lowered relative to chamber 4. This controls the level to which water rises in chamber 4 and thus the contact time between water and the salt. For most soluble materials, the contact time is proportional to the concentration of solution (up to saturation). Thus, by regulating the uppermost leg of the U-tube (siphon) a desired quantity and concentration of the solution is formed and intermittently exited through delivery means thereby complying with any desired application. Insolubles which precipitate in the solution settle downwardly by gravity, eventually passing down through funnel 13 in the lower portion of chamber 3 where they are isolated from the solution discharged to the pool.

After the insoluble precipitates have accumulated to such an extent that draining is necessary, valve 15' may be opened and the solids removed. Often these insolubles adhere quite tightly to the walls of the lower portion of chamber 3. If this occurs, baffle 25, by being placed immediately in front of valve 15, provides a swirling action of the incoming cleaning agent which facilitates the removal of these insolubles. In this embodiment, valve 15' may be utilized in this lower chamber to provide an outlet for cleaning agent and insolubles and thus permit a thorough flushing of the entire chamber. After an extended period of operation, more complete cleaning of precipitates adhering to the sides of the upper portion of chamber 3 and receptacle 4 usually is advisable. This cleaning may be accomplished by removing the calcium hypochlorite and then adjusting U-tube 19 such that it rises above the level of previous operation. An acid solution such as one formed from sodium hydrogen sulfate or hydrochloric acid and water may then be substituted and the device operated for some time as hereinbefore described with the solution rising up past the level of previous operation until the adhering, undesirable precipitates have been removed.

Bulb 17 along tube 16 and the hole 21 along tube 20 insure the constant and uniform operation of the siphon at all times during use. It is important to insure the commencement of the siphon action and its termination. A failure of either the siphon to start or to stop renders the device useless in its function. Thus, bulb 17 allows the air bubbles to separate from the solution near siphon cycle end to permit the siphon action to break. Likewise, discharge port 21 permits complete drainage of the downleg of the siphon such that the siphon does not continue to operate from the gravity action of the solution still contained therein.

Also important to the successful operation of the siphon is the ratio of the rate of solvent feed to the rate of solution flow. If this rate is large and the solution is not exited rapidly enough compared to solvent addition, the siphon may never be broken but instead will continue operating. On the other hand, if the ratio is small and the addition of solvent is slow compared to solution discharge, the siphon may never start. In accordance herewith, the discharge rate should be 2–10 times, preferably 4–5 times, the rate of solvent addition. The rate at which water enters chamber 3 may be controlled by the size of orifice 11 as well as the pressure head created by the height of reservoir 6. A suitable diameter orifice is chosen to provide a rate of flow of solution from chamber 3 which is 4–5 times the rate of addition of water into chamber 3. If this is not controlled, failure of the siphon to start or to stop is likely. Thus, a large amount of solvent may be consumed in the operation of this device to form the preferred solution without danger of siphon failure. The siphon bulb and pressure equalizer embodiments insure the smooth and uniform function of the siphon even though the siphon assembly tube diameters may be large so that a large amount of solution is discharged at each successive cycle. Although, however, a large amount of solvent can be tolerated by the device at maximum efficiency of its functional parts, small rates of solvent addition are equally tolerable. The ratio of the influent and effluent flows should fall within the hereinbefore given preferred range for optimum results.

Funnel member 13 operates very efficiently in removing insoluble material which heretofore was discharged along with solution used for whatever purpose desired. This device thus eliminates the problem of accommodating these undesirable precipitates by allowing them to settle out of the solution and be forwarded by member 13 into an isolated chamber where they are undisturbed by continued operation of the device. A problem is thus solved by this device in its removal of this objectionable and unwanted insoluble material from the formed solution.

Although this device will function efficiently and smoothly in the manner recited hereinbefore, certain alternate embodiments and procedures may also be employed to provide an even greater application. This device may be used to form a solution of any desired soluble material and any desired solvent and periodically discharge it into a reservoir, continuous stream, junction in a process, or the like. This soluble material can be one which has no insoluble material present in which case the device will function only as a means of discharging a solution of the material. The application of this device should not be limited to those which teach removal of insoluble precipitates. It can most readily be used to chlorinate swimming pools or the like.

Separation of solution from insoluble material can be even more efficiently accomplished by locating in chamber 3 exit tube 16 including bulb 17 below and laterally of receptacle 4. Thus, in this embodiment chamber 3, especially in the zone wherein exit tube 16 is located, extends laterally of the chamber 4. This permits the insoluble material to settle down and be caught below trough 13 before the siphon starts. Separation of solution and insoluble precipitate, however, also is accomplished with receptacle 4 and tube 16 adjacent to one another.

In order for the siphon to act without restriction, tube 20 should discharge the solution into an open vessel above the level of any already contained solution. An obstruction of tube 20 preventing it to deliver solution freely interferes with the successful operation of the siphon. Therefore, this device may be used to advantage to chlorinate a swimming pool by setting the device at the side of the pool and allowing the solution to be discharged directly therein. If it is desired to admit the chlorine containing solution into the influent water recycling system of the pool, this device may be used to discharge its solution into a small reservoir above the level of any solution already contained therein. The solution from this reservoir may then be removed and admitted to the pool or the like by suction action created by a venturi tube which can be conveniently attached to the inlet adaptor of the pool. Alternately, a Pitot tube arrangement may be adapted to the pool inlet to admit the solution from the separate reservoir by suction action created from influent water within the tube. If these procedures are followed, the chlorine containing solution can be distributed evenly throughout the pool by the action of the recycling system of the pool. The removal flow by the venturi tube or the Pitot tube can be adjusted such that each successive portion of solution added to the reservoir by intermittent siphon flows can be removed before the next siphon cycle begins. In this manner, the requirement that the solution discharge tube be free of any obstruction is maintained and yet the solution can be conveniently added in conjunction with any existing recycling system of the pool. This same procedure may be used effectively with the addition of any solution to any reservoir. Thus it can be seen that this device may be used separately or in combination with virtually any already existing adapter for the delivery of the solution. A modification of this device may include utilizing tube 16 with a large diameter. This will permit a constant, slow removal of solution from chamber 3 at the same rate as solvent is added through tube 10 without siphon action ever beginning. The level of the solution will then remain at a level about parallel with the top of U-tube 19 while insoluble precipitates settle downwardly into the separate lower portion of chamber 3.

A further modification involves the removal of the siphon tube and the embodiment of means to introduce solvent into receptacle 4 and to remove the solution formed therein through an exit located somewhere above the inlet of the solvent. Again, the solution level will remain about at the exit position while the insoluble precipitates settle out and are isolated. Channeling of the salt by solvent is prevented thereby because the salt is constantly filling the entire receptacle through the force of gravity.

In lieu of orifice 11 a stopcock may be employed to provide for variable solvent flow. This allows convenient varying of the flow to suit any particular application.

In order to prevent bridging of the salt tablets the walls of receptacle 4 may be tapered slightly to allow the force of gravity to keep the tablets at the bottom of the receptacle.

Although this invention has been primarily described with respect to calcium hypochlorite, other solid soluble materials including granules or chips, etc. may be dissolved among which there may be mentioned sodium carbonate brickets, sodium bisulfate brickets, aluminum sulfate, alkali metal salts of chlorocyanuric acid, and chlorohydantoins. Best results are usually obtained when the solids are compacted or pelletized; nevertheless powdery forms may be used.

While the invention has been described with respect to certain embodiments and details thereof, it is not intended to be limited to such details except insofar as they appear in the appended claims.

I claim:

1. A device for the formation and delivery of a solution of soluble material comprising an upper chamber for said soluble material superimposed above a lower chamber which is in liquid communication with the upper chamber, means for continuously delivering solvent at a substantially constant head to the lower chamber so that it forms a body of liquid which will rise from the lower chamber to the upper chamber to contact material in the upper chamber and form a solution of soluble material therein, siphon means responsive to the level of the liquid body for periodically draining solution from the upper chamber by discharging the solution from the lower chamber of device and means above the bottom of the lower chamber and below that level at which liquid is discharged by the siphon from the lower chamber comprising a structure having a downwardly, inwardly directed upper surface partitioning the lower chamber into upper and lower zones for collecting and sliding insolubles downwardly along said upper surface and forwarding said insolubles through the lower end of said structure to accumulate in the lower zone of the lower chamber.

2. The device as in claim 1 wherein said siphon means includes an increased volume means on its upleg to insure uniform operation of the said siphon.

3. The device as in claim 1 wherein the downleg of said siphon means contains siphon breaking means for completing drainage in said downleg.

4. The device of claim 1 wherein the said means in the lower chamber comprises a circumferentially, downwardly, inwardly radiating funnel structure which facilitates the sliding of insolubles along its upper surface to forward them through the lower end of said funnel structure into the lower zone.

5. The device of claim 1 which includes a reservoir means above the lower chamber providing a constant level liquid source for supplying the said means for delivering solvent at a substantially constant head to the lower chamber, said reservoir means being provided with inlet means for feeding continuously liquid to said reservoir, overflow means for removing excess liquid therefrom and a liquid outlet means in the bottom of said reservoir for conducting liquid to said solvent delivery means.

6. The device of claim 1 which includes means in the lower zone of the lower chamber for removing insolubles collected in the lower zone of the lower chamber.

References Cited

UNITED STATES PATENTS

| | | | |
|---|---|---|---|
| 1,695,354 | 12/1928 | Thomason | 23—272 |
| 2,603,534 | 7/1952 | Miller | 23—272 X |
| 3,094,134 | 6/1963 | Currie | 23—267 X |
| 3,107,156 | 10/1963 | Fredericks | 23—267 |
| 3,129,172 | 4/1964 | Dickey | 210—169 |
| 3,227,524 | 1/1966 | White | 23—312 X |
| 2,281,140 | 4/1942 | Courthope | 23—272.6 |

FOREIGN PATENTS 50,741  9/1917  Sweden.

OTHER REFERENCES

Klacsmann, Abstract of Invention, S.N. 621,848, 645 O.G. 1359, Apr. 24, 1951.

Cenco, Cat. J–300, Oct. 20, 1961, page 105.

NORMAN YUDKOFF, *Primary Examiner.*

S. J. EMERY, *Examiner.*